(No Model.) 2 Sheets—Sheet 1.
T. A. ZELLERS.
CARRIER FOR CONVEYING GLASS FROM FLATTING OVENS.
No. 474,983. Patented May 17, 1892.
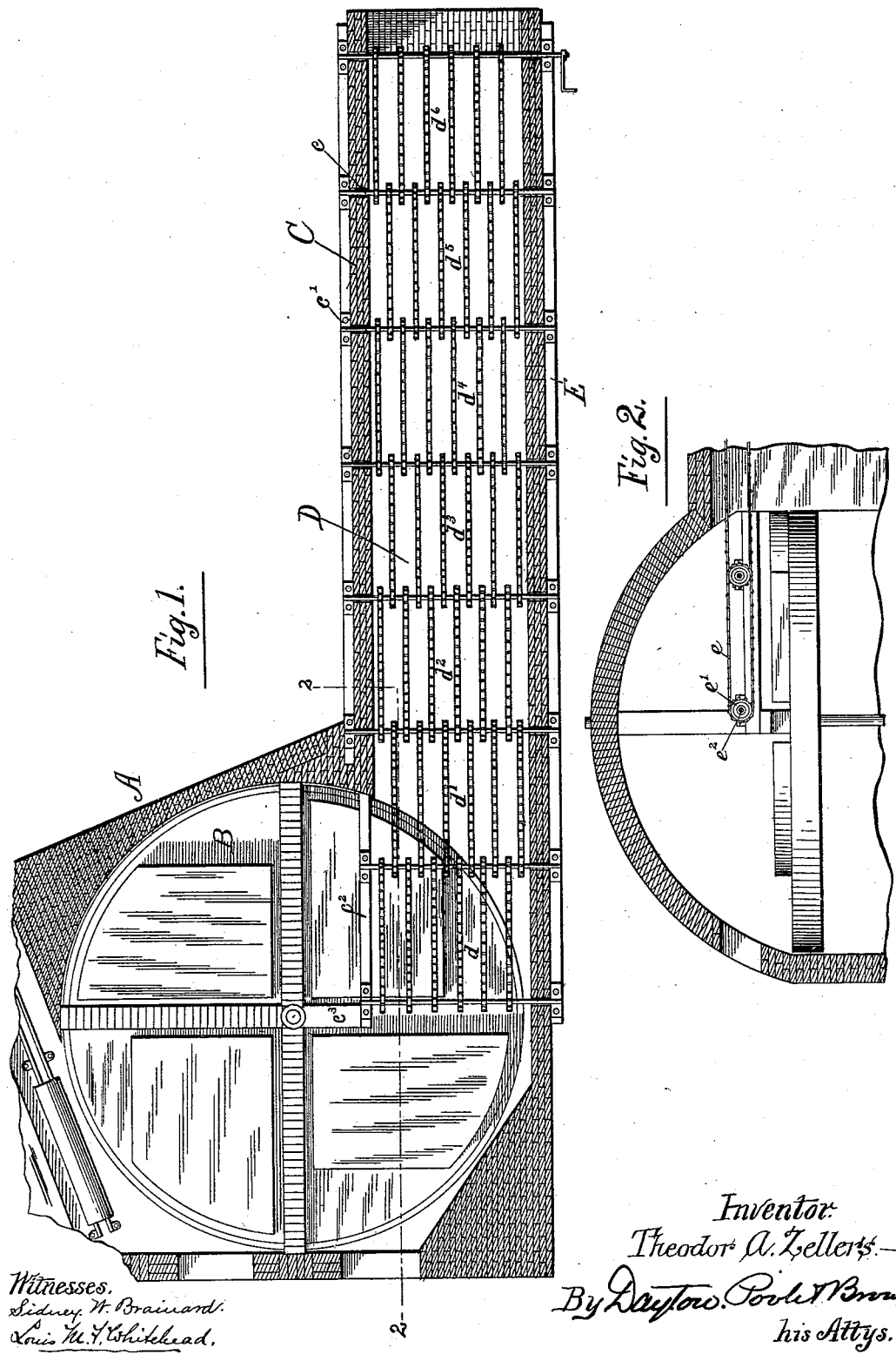
Witnesses.
Sidney W. Brainard.
Louis M. T. Whitehead.
Inventor:
Theodor A. Zellers.—
By Dayton, Poole & Brown
his Attys.

(No Model.) 2 Sheets—Sheet 2.

T. A. ZELLERS.
CARRIER FOR CONVEYING GLASS FROM FLATTING OVENS.

No. 474,983. Patented May 17, 1892.

Witnesses.
Sidney W. Brainard.
Louis M. F. Whitehead.

Inventor.
Theodor A. Zellers.
By Dayton, Poole & Brown
his Attys.

United States Patent Office.

THEODOR A. ZELLERS, OF OTTAWA, ILLINOIS, ASSIGNOR TO THE OTTAWA GLASS COMPANY, OF SAME PLACE.

CARRIER FOR CONVEYING GLASS FROM FLATTING-OVENS.

SPECIFICATION forming part of Letters Patent No. 474,983, dated May 17, 1892.

Application filed December 22, 1891. Serial No. 415,858. (No model.)

*To all whom it may concern:*

Be it known that I, THEODOR A. ZELLERS, of Ottawa, in the county of La Salle and State of Illinois, have invented certain new and useful Improvements in Carriers for Conveying Glass from Flatting-Ovens; and I do hereby declare that the following is a full, clear, and exact description thereof, reference being had to the accompanying drawings, and to the letters of reference marked thereon, which form a part of this specification.

This invention relates to devices for conveying sheets of glass from the table of a flatting-oven through the annealing-tunnel.

It has for its object to provide a construction whereby a continuous motion is given to the flattened plates through the tunnel and in which the different portions of the carrier are of less temperature the farther they are from the flatting-oven, corresponding, therefore, with the diminishing temperature of the receding glass plates which it carries.

To this end the invention consists, essentially, in a series of short endless metallic chain-carriers severally composed of a plurality of chains arranged side by side and as complete sections arranged end to end to form the complete carrying device.

Heretofore an entire carrier composed of a number of endless chain belts arranged side by side and of the full length of the carrier has been tried and found unsuitable for the purpose. In that case, because each chain extended the entire length of the carrier and passed from the interior of the oven to the outer extremity of the tunnel, all portions of each of the chains were successively subjected to the high heat of the oven and the low heat at the outer end of the tunnel. The result was that they were not hot enough when within the oven and were too hot when at the opposite extremity of the tunnel. The effect upon the glass was of course to frequently break it by reason of the wide differences in temperature between the plates and the carrier.

By my improvement the advantages of the endless-chain carrier are fully secured and the objections attendant upon the carrier constituted of the continuous belts referred to are obviated.

Figure 3:
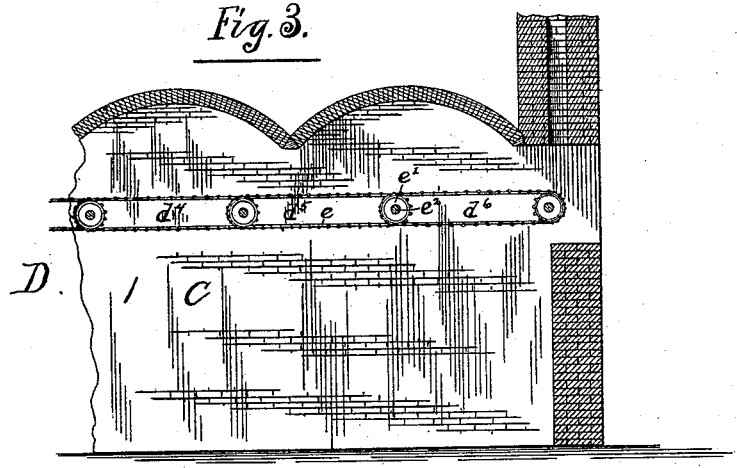
Figure 4:
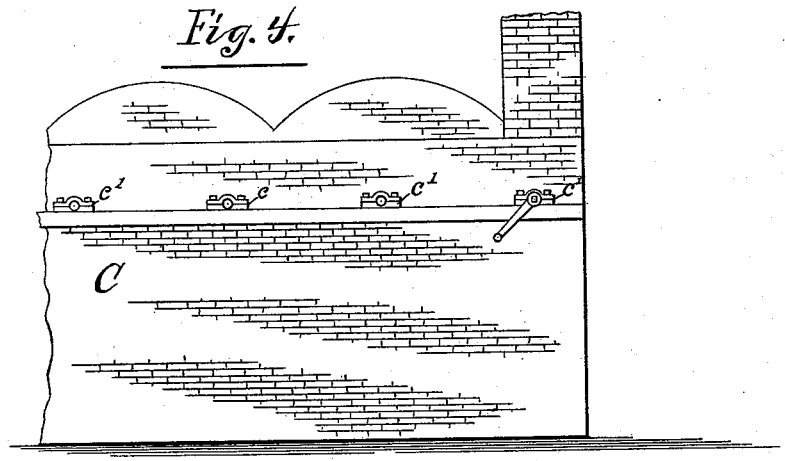
Figure 5:
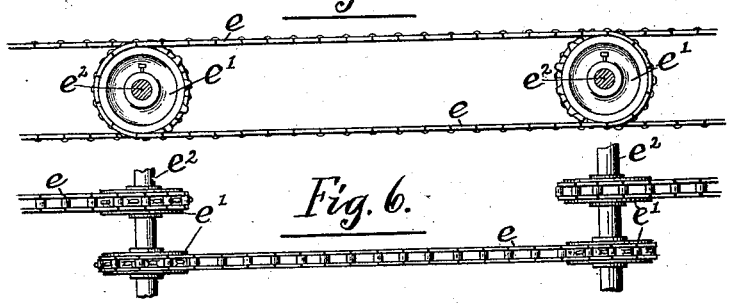
Figure 6:
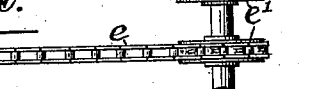

Referring to the accompanying drawings, which illustrate an application of my invention to a flatting-oven and tunnel, Figure 1 is a horizontal section of a flatting-oven and its connected tunnel in a plane above the carrier. Fig. 2 is a vertical section through the oven and adjacent portion of the tunnel in line 2 2 of Fig. 1. Fig. 3 is a vertical section in the same line of the outer extremity of the tunnel. Fig. 4 is an external side view of the outer portion of the tunnel. Fig. 5 is an enlarged side elevation of a section of the endless-chain-belt carrier. Fig. 6 is a detail plan view of a portion of the same.

A represents a flatting-oven, B a revolving flatting-table therein, and C a tunnel leading from the oven. Within this tunnel is arranged an endless-chain-belt carrier D, of which $d$ $d'$ $d^2$, &c., are the sections. Each of the sections of the carrier D is composed of a series of relatively short endless chain belts $e$ $e$, trained over sprocket-pulleys $e'$ upon transverse shafts $e^2$. The shafts $e^2$ at the extremities of the entire carrier have only one series of sprocket-pulleys $e'$; but all the intervening shafts are, as shown and as preferably constructed, provided with double the number of sprocket-pulleys, so that the endless belts of adjacent sections connect with each other through common pulley-shafts and the chains of adjacent sections interlap with each other and give a continuous and uniform moving surface to the carrier as a whole. In this construction power may be applied to any one of the shafts $e^2$, as indicated, by a crank on the shaft at the outer extremity of the carrier.

As a means of supporting the sprocket-carrying shafts, which are of course arranged transversely to the tunnel C, I prefer to provide holes or passages $c$ $c$ through the walls of the tunnel and journal-boxes $c'$ for the shafts exterior to the latter for all ends of shafts not within the oven. The inner extremities of the shaft or shafts which are within the oven may have their journal-bearings supported in any suitable manner, the illustration given in Fig. 1 showing said bearings to be upheld upon an iron beam $c^2$, resting at its outer end in the masonry and at its inner end upon a projecting beam $c^3$, supported and protruding from the junction of the adjacent interior arches. As a desirable construction for the support of the journal-bearings which are external to the tunnel-walls, I prefer to employ wooden beams or stringers F, resting upon and fastened to ledges formed on the outer surfaces of the tunnel-walls, the journal-boxes being bolted to these stringers.

The details of construction may be modified according to circumstances or to the preferences of the builder. The essential feature of the invention is the chain-belt carrier made of relatively short sections arranged end to end, whether interlapping or not, and adapted to acquire and preserve the temperature of the oven and tunnel at the points where they are severally located, so that the carrier as a whole has a gradually-diminishing temperature from the oven outwardly toward its delivery end corresponding with the diminishing temperature of the tunnel itself and with that of the glass which it carries.

I claim as my invention—

1. The combination, with a flatting-oven and tunnel, of a carrier for transporting the glass from the oven through the tunnel, composed of a series of relatively short sections placed end to end and consisting each of a transverse series of endless belts, substantially as described.

2. In combination with a flatting-oven and tunnel, a carrier composed of sections severally made up of a transverse series of endless belts and transverse pulley-shafts, of which the intermediate shafts carry the pulleys for the two adjacent sections.

3. In combination with the tunnel leading from a flatting-oven and a belt-carrier within the tunnel, composed of short endless belts arranged end to end, shafts for the carrier, which project through the side walls of the tunnel, and journal-bearings for said shaft exterior to said side walls.

In testimony that I claim the foregoing as my invention I affix my signature in presence of two witnesses.

THEODOR A. ZELLERS.

Witnesses:
M. E. DAYTON,
C. CLARENCE POOLE.